(12) United States Patent
Van Den Haak et al.

(10) Patent No.: US 8,969,438 B2
(45) Date of Patent: Mar. 3, 2015

(54) PIGMENT CONCENTRATE

(75) Inventors: Hendrik Jan Willem Van Den Haak, Sassenheim (NL); Jamie MacLiver Roy, Leiden (NL); Claudio Argentino Di Lullo, Greenhead Brampton (GB); Colin Cameron, Stocksfield (GB); Lorenzo Soldavini, Gallarate (IT); Bhuvaneswaran Ganesh, Hoskote (IN)

(73) Assignee: Akzo Nobel Coatings International B.V., Arnhem (NL)

( * ) Notice: Subject to any disclaimer, the term of this patent is extended or adjusted under 35 U.S.C. 154(b) by 1110 days.

(21) Appl. No.: 12/440,682

(22) PCT Filed: Sep. 24, 2007

(86) PCT No.: PCT/EP2007/060079
§ 371 (c)(1),
(2), (4) Date: Mar. 27, 2009

(87) PCT Pub. No.: WO2008/037678
PCT Pub. Date: Apr. 3, 2008

(65) Prior Publication Data
US 2010/0010150 A1 Jan. 14, 2010

Related U.S. Application Data

(60) Provisional application No. 60/858,290, filed on Nov. 10, 2006.

(30) Foreign Application Priority Data

Sep. 26, 2006 (IN) .............................. 981/KOL/2006
Nov. 9, 2006 (EP) ..................................... 06123764

(51) Int. Cl.
*C08J 3/20* (2006.01)
*C09D 17/00* (2006.01)
*C08J 3/22* (2006.01)
*C09B 67/20* (2006.01)

(52) U.S. Cl.
CPC ............... *C09D 17/002* (2013.01); *C08J 3/226* (2013.01); *C09B 67/0063* (2013.01); *C09B 67/0069* (2013.01); *C08J 2467/00* (2013.01)
USPC ............................ 523/351; 524/505; 524/513

(58) Field of Classification Search
USPC .................................. 524/505, 513; 523/351
See application file for complete search history.

(56) References Cited

U.S. PATENT DOCUMENTS 5,041,477 A * 8/1991 Hays ................................ 524/88
5,753,756 A 5/1998 Aerts et al.

FOREIGN PATENT DOCUMENTS

| EP | 1 571 189 | 9/2005 |
|---|---|---|
| WO | WO 02/051946 | 7/2002 |
| WO | WO 02/096997 | 12/2002 |
| WO | WO 03/004557 | 1/2003 |
| WO | WO 03/089522 | 10/2003 |

OTHER PUBLICATIONS

"Glossary of Terms for Surface Active Agents," *British Standard ISO 862*, 1995.
International Search Report, International PCT Application No. PCT/EP2007/060079, mailed Jan. 17, 2008.
Response to Written Opinion, dated May 15, 2008.

* cited by examiner

*Primary Examiner* — Peter D Mulcahy
(74) *Attorney, Agent, or Firm* — Kenyon & Kenyon LLP

(57) ABSTRACT

Non-aqueous pigment concentrate comprising one or more pigments, one or more dispersants, and at least one resin, characterized in that the resin is a polyester comprising at least one oligo-ester building block with a hydrophobic tail linked thereto, wherein the hydrophobic tail is selected from the group consisting of: (a) branched hydrocarbons, (b) hydrocarbons containing a cyclic group, and (c) linear hydrocarbons, provided that when said linear hydrocarbon is linked to the oligo-ester building block via an ester group, the linear hydrocarbon contains 3 to 12 carbon atoms.

13 Claims, No Drawings

PIGMENT CONCENTRATE

REFERENCE TO RELATED APPLICATION(S)

This application is the U.S. National Phase of PCT/EP2007/060079 filed on Sep. 24, 2007 and claims the benefit of U.S. Provisional Application No. 60/858,290 filed on Nov. 10, 2006.

The present invention relates to a non-aqueous pigment concentrate comprising one or more pigments, one or more pigment dispersants, one or more resins, and optionally one or more solvents and/or diluents. In the paint industry, stock control and logistics are often rationalized by using colour mixing systems. These include systems where the paint formulation selected by a user is produced by selecting a base paint from a limited number of available base paints and tinting the selected base paint with the aid of one or more pigment concentrates or tinting pastes. In other systems, pigment concentrates are mixed with resin compositions to form a paint or toner of a colour and in a next step an appropriate selection of these toners is mixed to form a paint of a desired end colour. Pigment concentrates generally distinguish themselves from pigmented coating compositions in that they have higher pigment loads than colour strength requires.

Pigment concentrates differ from coating compositions in their generally higher pigment concentration and the limited number of pigment types they contain—usually one, sometimes two. The pigments present in pigment concentrates are colouring pigments, whereas coating compositions generally also contain extender pigments and other functional pigments. Further, although pigment concentrates may be film-forming, the resultant films will not have the performance—as to solvent resistance, for instance—associated with coating compositions.

For environmental reasons, it is desirable to reduce the emission of volatile organic compounds and, hence, the solvent content. To balance pigment concentrate viscosity requirements with a minimized volatile organic content (VOC), additional resins typically having a relatively low molecular weight can be used. Such resins can help also to prevent the agglomeration of pigments at the moment when the pigment concentrate is mixed into the base paint and help to compatibilize the pigment concentrate content with the base paint binder system. Non-volatile reactive and/or non-reactive diluents may also be used to reduce the VOC.

Pigments of the various colours, pigment dispersants, diluents, and solvents can vary considerably in nature. Hence, it is often necessary to use a compatibilizer resin which is compatible not only with various types of dispersants and solvents but also with various types of base paint binder systems or let-down resins used to make toners. Also, the compatibilizer aids the incorporation of the colorant into the base paint.

A pigment concentrate comprising a polyester resin is disclosed for example in WO 02/096997. These polyesters are oxidatively drying alkyds which do not have broad compatibility with other binder systems.

WO 03/089522 discloses pigment dispersions comprising carbamate-functional polyester pigment dispersants. The carbamate groups serve as an anchoring group which is affinitive with pigment particles. The volatile organic content is high and substantially above 350 g/l.

The object of the present invention is to provide a non-aqueous pigment concentrate comprising a resin which is widely compatible with different binder systems. A further object is to provide a resin which allows the formulation of pigment concentrates having a low volatile organic content (VOC).

This object is achieved by a non-aqueous pigment concentrate comprising one or more pigments, one or more dispersants, and at least one resin, characterized in that the resin is a polyester comprising at least one oligo-ester building block with a hydrophobic tail linked thereto, wherein the hydrophobic tail is selected from the group consisting of: (a) branched hydrocarbons, (b) hydrocarbons containing a cyclic group, and (c) linear hydrocarbons, provided that when said linear hydrocarbon is linked to the oligo-ester building block via an ester group, the linear hydrocarbon contains 3 to 12 carbon atoms.

The concentrate may further comprise one or more solvents and/or diluents, as long as the pigment concentrate remains non-aqueous, which is defined as containing less than 5 wt % of water, based on the total weight of the pigment concentrate. More preferably, the pigment concentrate contains less than 2.5 wt %, even most preferably less than 1 wt % of water.

The oligo-ester building blocks can be formed by reacting one or more anhydrides and/or the corresponding dicarboxylic acids with one or more diols and/or monoepoxides having a pendant hydrophobic group, thereby forming ester linkages. An example of a suitable monoepoxide is glycidyl neodecanoate. Surprisingly, it was found that such polyesters are compatible with a wide range of binder resins and solvent types.

The term "oligo-ester building block" is defined as a building block which contains at least one ester group and is linked to other building blocks of the polyester by at least one ester group.

The polyester present in the pigment concentrate according to the present invention contains on average at least 1, preferably 2-7, more preferably 2-5, and most preferably 3-5 oligo-ester building blocks.

The oligo-ester building block can have a structure according to the following formula:

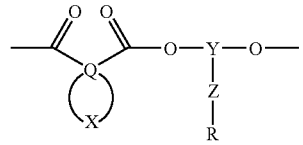

wherein:
Q=a covalent bond or a hydrocarbon radical with at least one, preferably 1-4, more preferably 2-4, and most preferably 2 carbon atoms;
X=a divalent, optionally branched and/or substituted, radical, e.g., a saturated or unsaturated hydrocarbon radical containing at least 2 carbon atoms, optionally comprising further ester groups;
Y=a trivalent hydrocarbon radical;
Z=a group linking the hydrophobic tail to the oligo-ester building block, or a covalent bond. Examples of suitable linking groups are ester groups, ether groups, C—C single or double bonds
R=the hydrophobic tail.

Alternatively, building blocks having a similar structure but without the X group can be used. In another embodiment, oxalic acid can be used to introduce the ester groups. In that case, both Q and X are absent from the building block.

As can be seen in the above structure, the oligo-ester building block contains at least one ester group and can be linked to other building blocks by ester groups.

Oligo-ester building blocks wherein Q and X are present to form a ring can for example be obtained by esterifying cyclic anhydrides or their corresponding dicarboxylic acids possessing cyclic groups with groups bearing a hydrophobic tail. The anhydride can for example be a cyclic anhydride of unsaturated, aromatic and/or saturated cyclic or acyclic dicarboxylic acids. The anhydride can for example be phthalic anhydride, hexahydrophthalic anhydride, methyl-hexahydrophthalic anhydride, tetrahydrophthalic anhydride, or mixtures thereof. Suitable dicarboxylic acids are, for example, the carboxylic acids of the aforementioned anhydrides or, e.g., 1,3-cyclohexane dicarboxylic acid or 1,4-cyclohexane dicarboxylic acid, or their cyclopentane or cycloheptane counterparts.

Acyclic oligo-ester building blocks, wherein X is absent, can be obtained using for instance succinic anhydride, maleic anhydride, malonic anhydride, the corresponding dicarboxylic acids, or oxalic acid.

Oligo-ester building blocks wherein X comprises an ester group can for example be obtained using tricarboxylic acids or their anhydrides, such as trimellitic anhydride.

Any combination or mixture of the listed acids and/or anhydrides can also be used to obtain oligo-ester building blocks.

The carboxylic acids or anhydrides can be linked by esterification with a monoepoxide bearing a hydrophobic tail to form the oligo-ester building block. Suitable monoepoxides are, for example, epoxidized olefins, such as cyclohexene oxide or epoxidized α-olefins, e.g., dodecene oxide, tetradecene oxide, and octadecene oxide; glycidyl ethers, such as ethylhexyl glycidyl ether, n-butyl glycidyl ether, t-butyl glycidyl ether, hexyl glycidyl ether, phenyl glycidyl ether; and the glycidyl esters of carboxylic acids, such as versatic acid glycidyl ester, e.g., glycidyl neodecanoate, commercially available from Hexion as Cardura® E10P or mixtures thereof. Other suitable examples are epoxy-containing aromatic hydrocarbons such as styrene oxide.

Instead of or in addition to monoepoxides, diols can be reacted with the carboxylic acids or anhydrides to form the oligo-ester building block. Suitable diols include 1,3-propane diol, 1,2-ethane diol, 1,4-butane diol, 1,5-pentane diol, 1,6-hexane diol, diethylene glycol, triethylene glycol, polyethylene glycols, dipropylene glycol, and polytetrahydrofuran. Suitable branched diols include dimethylol propane, neopentyl glycol, 2-propyl-2-methyl-1,3-propane diol, 2-butyl-2-ethyl-1,3-propane diol, 2,2-diethyl-1,3-propane diol, 1,2-propane diol, 1,3-butane diol, 2,2,4-trimethylpentane-1,3-diol, trimethylhexane-1,6-diol, 2-methyl-1,3-propane diol, tripropylene glycol, and polyoxypropylene glycols. Suitable cycloaliphatic diols include 1,4-cyclohexane diol, cyclohexane dimethanol and cyclic formals of pentaerythritol, and 1,3-dioxane-5,5-dimethanol. Suitable aralkyl diols include 1,4-xylylene glycol and 1-phenyl-1,2-ethane diol.

If it is desired to obtain a branched polyester, polyols and/or polyacids may be used.

Polyols include polyfunctional phenols, triols, and tetrols. Suitable triols include glycerol, trimethylol propane, trimethylol ethane, trimethylol butane, 3,5,5-trimethyl-2,2-dihydroxymethylhexan-1-ol, and 1,2,6-hexane triol. Alternatively, cycloaliphatic and aralkyl triols and/or corresponding adducts with alkylene oxides or derivatives thereof can be used. Suitable tetrols include erythritol, pentaerythritol, ditrimethylol propane, diglycerol, and ditrimethylol ethane. It is also possible to use cycloaliphatic and/or aralkyl tetrols as well as corresponding adducts with alkylene oxides or derivatives thereof. Polyols with even more hydroxyl groups, such as dipentaerythritol, dulcitol, and threitol, can also be used.

Such polyols are particularly useful as starter molecules to obtain branched star-shaped molecules.

Suitable polyacids include 1,2,4-butane tricarboxylic acid and trimellitic acid. Acid alcohols, such as tartaric acid and 2,2-bis(hydroxymethyl) propanoic acid, can be used additionally or alternatively.

A polyester prepared with pentaerythritol as a starter molecule can have the following structure:

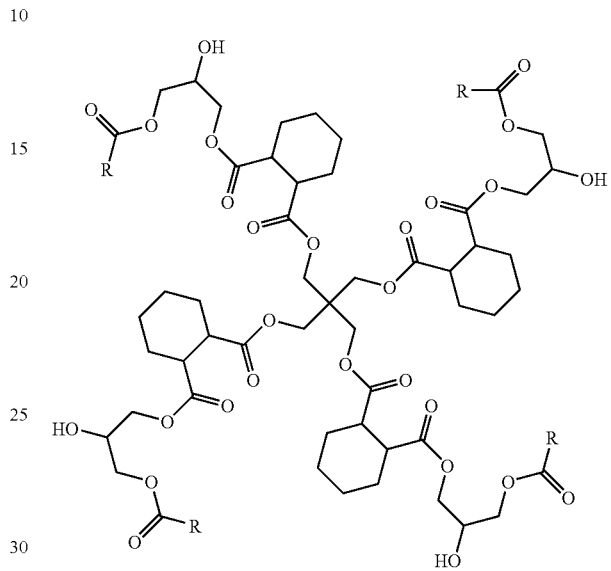

wherein R is the hydrophobic tail.

Optionally, the polyesters may contain a repetition of oligo-ester building blocks formed from the alternating reaction of a cyclic anhydride or diacid with a (mono)epoxide or diol. This can for example be initiated by a monofunctional, difunctional or polyfunctional starter molecule and can be catalyzed, for instance by catalysts such as zinc salts, e.g., zinc acetate.

Monoalcohols can for instance be used as a starter molecule. Suitable mono-functional alcohols for use as starter molecules include linear alcohols, such as methanol, ethanol, hexanol, butanol, octanol, hexadecanol, etc., branched alcohols, such as iso-propanol, 2-ethylhexanol, etc., cycloaliphatic alcohols, such as cyclohexanol, aralkyl alcohols, such as benzyl alcohol, or phenol.

For example. a polyester prepared with 2-ethylhexanol, hexahydrophthalic anhydride, and a glycidyl ester can have the following structure:

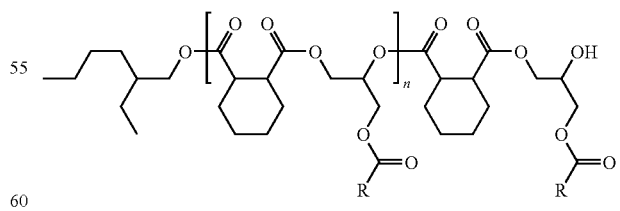

wherein R is the hydrophobic tail, e.g. a hydrocarbon group, and n≥0, preferably 0-6, more preferably 1-5, and most preferably 2-4. Another example is a similar polyester with groups derived from glycidyl ethers.

Other possible starter molecules are amines. Suitable primary amines include monoamines, e.g. alkyl amines such as butyl amine, and diamines, e.g., alkylene diamines such as ethylene diamine. Secondary monoamines, such as piperidine, dialkyl amine, e.g. dibutyl amine, or diamines, such as piperazine, can also be used.

Suitable carboxylic acid-functional starter molecules include monoacids, such as 2-ethylbutyric acid, or cyclohexane carboxylic acid, diacids, such as adipic acid or 1,4-cyclohexane dicarboxylic acid, and polyacids, such as 1,2,4-butane tricarboxylic acid.

Monothiols, such as dodecane thiol, dithiols, or polythiols, such as pentaerythritol tetrakis (3-mercaptopropionate), can also be used as starter molecules. Further, blends of two or more of the aforementioned starter molecules can be used. Alternatively or additionally, starter molecules of mixed functionality can be used, such as acid alcohols, amine alcohols, aminoacids, aminothiols, acid thiols, thiol alcohols or starters having more than two different functionalities. Suitable acid alcohols include tartaric acid and 2,2-bis-(hydroxymethyl) propanoic acid. Suitable amine alcohols include diethanolamine and 1-(2-hydroxyethyl) piperazine. A suitable example of an acid thiol is 3-mercaptopropanoic acid. A suitable example of a thiol alcohol is 2-thioethanol. Polymeric starters, such as acrylic polyols and acrylic acid alcohols, may also be used.

If desired, the hydroxy-functional starter molecules may be generated in situ, for instance via the reaction of an epoxide with a monocarboxylic acid. A suitable epoxide is for example glycidyl neodecanoate. Other means of generating the hydroxyl group in situ include the reaction of an epoxide with an amine, thiol or phenol or the reaction of a cyclic lactone, e.g., ε-caprolactone, with an amine, an alcohol or a thiol.

If a monofunctional starter molecule is used, the resulting polyester will contain a tail originating from said starter molecule on one end of the polymer chain. The present invention therefore also relates to a polyester consisting of (i) at least one, preferably 1-7, more preferably 2-6, and most preferably 3-5 oligo-ester building blocks with the hydrophobic tail linked thereto, and (ii) a tail originating from a monofunctional starter molecule on one end of the polymer chain, said monofunctional starter molecule being selected from the group consisting of alcohols, amines, carboxylic acids, and thiols. Preferably, the hydrophobic tail is linked to the oligoester building block by an ester group. The monofunctional starter molecule preferably is a branched mono-alcohol, such as 2-alkyl alkanol, e.g. 2-ethylhexanol.

So, when the monofunctional starter molecule is 2-ethylhexanol, the resulting polymer chain will contain a 2-ethylhexyl tail on one end.

The polyester used in the present invention possesses hydrophobic tails. The term hydrophobic describes the tendency of a molecule or molecular group to pass out of or not penetrate into water, as defined in ISO 862: 1995. Hydrophobic properties of molecules or groups are generally linked to the presence of hydrocarbon groups. The hydrophobic tails preferably comprise 4-20, more preferably 6-16, even more preferably 8-10, and most preferably about 9 carbon atoms. The hydrocarbon tails can be saturated, unsaturated, or aromatic hydrocarbon groups and they may be branched, linear, or cyclic. The hydrophobic tails can for example also contain ether and/or ester groups, such as groups obtainable by the ring opening of ε-caprolactone by an acid or an alcohol. However, it is essential that when the hydrophobic tail is a linear hydrocarbon linked to the oligo-ester building block via an ester group (i.e. when Z is an ester group), the linear hydrocarbon contains 3 to 12 carbon atoms.

Preferably, the polyester has an acid value below 20 mg KOH/g, more preferably below 10 mg KOH/g, most preferably below 5 mg KOH/g. To reduce the acid value of the end product, an acid-reactive compound, such as a monoalcohol or monoepoxide, can be used for reaction with the terminal carboxylic acid groups of the polyester. Suitable compounds include the monoepoxides and monoalcohols listed above.

Optionally, the polyester resin may have hydroxyl-functional groups. In that case, they can be reacted in paint systems based on crosslinking with OH-reactive crosslinkers, such as isocyanates. The polyester preferably has a hydroxyl value of 0-250 mg KOH/g, more preferably 0-160 mg KOH/g. The hydroxyl value can be lowered, for example by reaction with OH-reactive compounds, such as acetic anhydride.

Whereas in WO 03/089522 polyesters with carbamate pigment anchoring groups are used as dispersants, the polyesters of the present invention are used as compatibilizer resins and combined with dispersants in the pigment concentrate. These dispersants typically comprise a polymeric part and one or more pigment-affinitive groups. Often, these dispersants are built as comb polymers having one or more polymer chains and one or more pigment-affinitive groups. Generally, a dispersant with a single polymer chain has a pigment-affinitive group at a terminal position. Other types of dispersants can have a backbone with pigment-affinitive groups and have polymeric tails which are soluble in the solvent to be used. In order to be soluble in organic solvents, the polymeric tails can for example consist mainly of aliphatic hydrocarbon parts. Generally, the pigment-affinitive groups are groups with high polarity, e.g. ionic groups, such as carboxylic, sulphate, sulphonate, amine salts, phosphate or phosphonate groups. Nonionic groups, such as carbamate, urea, amide or amine groups, can also be suitable pigment-affinitive groups. Suitable dispersants are for instance the Solsperse®, Solplus® and Ircosperse® dispersants, available from Lubrizol Advanced Materials, the Disperbyk® dispersants from Byk Chemie, the Efka® dispersants from Ciba, the Tego® dispersants from Degussa, and the Nuosperse® dispersants from Elementis Specialies. The amount of dispersant can for example be at least about 0.1% by weight of the pigments used, e.g., at least about 2% by pigment weight. The amount of dispersant can for example be below 100% by weight of the pigments used, e.g., below about 10% by pigment weight.

The pigment concentrate can contain solvents but may also be solvent-free if so desired. Suitable solvents include for example aromatic solvents, such as xylene, mesitylene, or the solvents marketed as Solvesso® 100 of Exxon. Aromatic-free solvents, such as aliphatic hydrocarbon solvents, e.g. isoparaffins; esters, such as n-butyl acetate; ethers, such as butoxy ethanol; ether esters, such as methoxy propyl acetate, or ketones, and alcohols, such as n-butanol, can also be used, as can white spirit. Alternatively or additionally, the composition may contain non-volatile reactive diluents, such as hexane diol diglycidyl ether, glycidyl neodecanoate, epoxidized linseed oil or benzyl alcohol, and/or non-reactive diluents, such as for instance dibutyl phthalate and liquid aromatic hydrocarbon resins, such as the hydrocarbons of the commercially available Hirenol® PL and CL series ex Kolon Chemical Company. Mixtures of any combination of two or more of the aforementioned solvents and/or diluents can also be used.

The pigments to be used can be inorganic or organic pigments. Examples of inorganic pigments include titanium dioxide, zinc oxide, carbon black, iron oxides, bismuth vanadates, raw and burnt sienna or umber, chromium oxide green, cadmium pigments, and chromium pigments. Examples of organic pigments include phthalocyanines, quinacridones, anthraquinones, isoindolines, pyranthrones, indanthrones, derivatives of dioxazine, diketopyrrolopyrroles, and azo-compounds.

The pigment concentrates of the present invention can also comprise effect pigments or luster pigments. These are platelet-shaped mono- or multi-layer pigments showing visual effects marked by the interplay of interference, reflection, and absorption phenomena. Examples are aluminium platelets and aluminium, iron oxide, and pearlescent or mica platelets bearing one or more coats, especially of metal oxides. Dichroic or colour shift pigments can also be used.

Optionally, filler pigments may be added, such as clay, barytes, silica, talc, mica, wollastonite, and the like.

High pigment contents can be realized in the pigment concentrates according to the present invention without the need to increase the solvent content, while maintaining a satisfactory viscosity. If organic pigments are used, the pigment content suitably ranges from 5-45% by weight, preferably from 25-40% by weight, based on the total weight of the pigment concentrate. If inorganic pigments are used, the pigment content may be more than 30% by weight, e.g., 40-60% by weight, or even higher, for instance in the case of titanium dioxide. If translucent pigments, e.g. translucent iron oxides, are used, the pigment content can be over 5% by weight, preferably over 20% by weight or even over 30% by weight. If carbon black is used, the pigment content may for instance be 10-20% by weight.

Preferably, the pigment concentrate has a volatile organic content VOC not exceeding 250 g/l, measured according to EPA method 24 of the US Environmental Protection Agency. Preferably, the VOC of the pigment concentrate is low enough to allow formulation of paints with a VOC not exceeding 100 g/l.

Optionally, the pigment concentrate comprises an additional resin, such as an acrylate resin or a urea-aldehyde resin. Suitable acrylic resins are for instance Setalux® 1385-51 available from Nuplex Resins. The mixing ratio between the additional resin and the polyester is preferably 0:1-4:1, more preferably 1:1-3:1.

The pigment concentrate according to the present invention can for example be prepared by grinding a pigment with a dispersant. The polyester is added during or after grinding. Optionally, further resins, such as an acrylic resin, may be added during or after grinding.

The pigment concentrate according to the present invention is suitable to tint various types of base paints. The base paints can be based on inorganic binders, such as polysiloxanes, or organic binders, such as acrylates, polyesters, alkyds or polyurethanes, or mixtures or hybrids thereof. Solvent borne base paints can for example be based on aliphatic or aromatic solvents. The pigment concentrate according to the invention can also be used in toner systems as described above.

The invention is further illustrated by the following examples.

EXAMPLES

Materials

In these examples the compositions listed below are available as indicated.

| | |
|---|---|
| Bayferrox® Yellow 3920 | yellow iron oxide pigment, of Bayer; |
| Cardura® E10P | glycidyl neodecanoate, available from Hexion; |
| Dowanol® PM Acetate | 1-methoxy-2-propyl acetate, available from Dow; |
| Disperbyk® 170 | dispersant, available from Byk Chemie; |
| Fascat® 4101 | butyl chlorotin dihydroxide catalyst, available from Arkema; |
| Intermediate® 3074 | polysiloxane, available from Dow Corning; |
| Irgazin® Red 2030 | red pigment, available from Ciba Specialty Chemicals; |
| Laropal® A81 | urea aldehyde resin, available from BASF; |
| Monastral® Blue CSN | blue copper (II) phthalocyanine pigment, available from Heubach; |
| Setal® 164, | polyester polyol resin, available from Nuplex Resins; |
| Setalux® 1161 | acrylate, available from Nuplex Resins; |
| Setalux® 1385-51 | acrylic polyol, available from Nuplex Resins; |
| Solsperse® 38500 | pigment synergist, available from Lubrizol Advanced Materials; |
| Solsperse® 5000 | dispersant, available from Lubrizol Advanced Materials; |
| Special Black 100 | carbon black, available from Degussa; |
| Sunfast® Blue 15.2 | blue pigment, available from Sun Chemical; |
| Synocure® 892 BA70 | acrylic polyamine, available from Cray Valley; |
| Tioxide® TR92 | titanium dioxide pigment, available from Huntsman; |
| Trigonox® 21 | tert-butyl peroxy-2-ethyl hexanoate, available from Akzo Nobel Chemicals. |

In the Examples, all amounts are in grams, unless indicated otherwise.

Example 1

In a 1-liter reaction flask equipped with a stirrer, a thermocouple, a condenser, a Dean-Stark trap, a nitrogen inlet, and a heating mantle, 104.3 g of neopentyl glycol were mixed with 308.7 g of hexahydrophthalic anhydride. The mixture was heated to 150° C. and kept at 150° C. for 1 hour. Then 52.1 g of neopentyl glycol were added together with 0.23 g of Fascat® 4101. The mixture was heated to 200° C. and kept at 200° C. for approximately 6 hours, after which it was cooled to 150° C. and 0.38 g triphenyl phosphine was added. Then 212.2 g of Cardura® E10P were added over 3 hours whilst maintaining the reaction at 150° C. After the addition of the Cardura® E10P the mixture was kept at the same temperature until an acid value <5 mg KOH/g was obtained.

Example 2

In a 1-liter reaction flask equipped with a stirrer, a thermocouple, a condenser, a Dean-Stark trap, a nitrogen inlet, and a heating mantle, 90.7 g of neopentyl glycol were mixed with 268.4 g of hexahydrophthalic anhydride. The mixture was heated to 150° C. and kept at 150° C. for 1 hour. Then 62.8 g of cyclohexane dimethanol were added together with 0.21 g of Fascat® 4101. The mixture was heated to 200° C. and kept at 200° C. for approximately 4 hours, after which it was cooled to 150° C. and 0.4 g triphenyl phosphine was added. Then 209.6 g of Cardura® E10P were added over 2 hours whilst maintaining the reaction at 150° C. After the addition of the Cardura® E10P the mixture was kept at the same temperature until an acid value <5 mg KOH/g was obtained.

Example 3

In a 1-liter reaction flask equipped with a stirrer, a thermocouple, a condenser, a Dean-Stark trap, a nitrogen inlet, and a heating mantle, 71.6 g of 2-butyl-2-ethyl-1,3-propanediol were mixed with 192.5 g cyclohexane-1,2-dicarboxylic acid and 0.13 g of Fascat® 4101. The mixture was heated to 200° C. and kept at this temperature for 1 hour, after which it was cooled to 150° C. and 0.55 g of triphenyl phosphine was added. Then 301.5 g of Cardura® E10P were added over 2 hours whilst maintaining the reaction at 150° C. The mixture was kept at the same temperature for a further 2 hours until an acid value <5 mg KOH/g was obtained.

Example 4

In a 0.5-liter reaction flask equipped with a stirrer, a thermocouple, a condenser, a nitrogen inlet, and a heating mantle, 31.6 g of 2-butyl-2-ethyl-1,3-propanediol were mixed with 79.4 g of hexahydrophthalic anhydride. The mixture was heated to 140° C. and kept at this temperature for 1 hour, after which 0.25 g of triphenyl phosphine was added. Then 142.2 g of Cardura® E10P were added over 2 hours whilst maintaining the reaction at 140° C. Then the mixture was kept at the same temperature until an acid value <5 mg KOH/g was obtained.

Example 5

In a 1-liter reaction flask equipped with a stirrer, a thermocouple, a condenser, a nitrogen inlet, and a heating mantle, 53.4 g of 2-ethylhexanol were mixed with 252.6 g of hexahydrophthalic anhydride. The mixture was heated to 150° C. and kept at the same temperature for 1 hour, after which 0.7 g of triphenyl phosphine was added. 393.3 g of Cardura® E10P were then added over 4 hours whilst maintaining the reaction at 150° C. After the addition of the Cardura® E10P, the mixture was kept at the same temperature until an acid value <5 mg KOH/g was obtained.

Example 6

In a 1-liter reaction flask equipped with a stirrer, a thermocouple, a condenser, a nitrogen inlet, and a heating mantle, 50.0 g of 2-ethylhexanol were mixed with 236.8 g of hexahydrophthalic anhydride. The mixture was heated to 150° C. and kept at the same temperature for 1 hour, after which 0.57 g of triphenyl phosphine was added. Then 286.1 g of 2-ethylhexyl glycidyl ether were added over 4 hours whilst maintaining the reaction at 150° C. After the addition of the Cardura® E10P, the mixture was kept at the same temperature until an acid value <20 mg KOH/g was obtained.

Example 7

In a 1-liter reaction flask equipped with a stirrer, a thermocouple, a condenser, a nitrogen inlet, and a heating mantle, 69.9 g of pentaerythritol were mixed with 316.6 g of hexahydrophthalic anhydride. The mixture was heated to 150° C. and kept at the same temperature for 1 hour, after which 0.91 g of triphenyl phosphine was added. Then 513.5 g of Cardura® E10P were added over 2.5 hours whilst maintaining the reaction at 150° C. After the addition of the Cardura® E10P, the mixture was kept at the same temperature until an acid value <5 mg KOH/g was obtained.

Example 8

In a 1-liter reaction flask equipped with a stirrer, a thermocouple, a condenser, a nitrogen inlet, and a heating mantle, 72.5 g of pentaerythritol were mixed with 328.4 g of hexahydrophthalic anhydride. The mixture was heated to 150° C. and kept at the same temperature for 1 hour, after which 0.98 g of triphenyl phosphine was added. 533.3 g of 2-ethylhexyl glycidyl ether were added over 4 hours whilst maintaining the reaction at 150° C. Subsequently, the mixture was kept at the same temperature until an acid value <15 mg KOH/g was obtained.

Example 9

An amount of 87.8 g of hexahydrophthalic anhydride was charged into a 0.5-liter reaction flask equipped with a stirrer, a thermocouple, a condenser, a nitrogen inlet, and a heating mantle. The charge was heated to 50° C. and 18.4 g of dibutyl amine were added over 30 minutes. The mixture was heated to 150° C. and kept at 150° C. for 1 hour, after which 0.25 g of triphenyl phosphine was added. 136.7 g of Cardura® E10P were then added to the mixture over 4 hours whilst maintaining the reaction at 150° C. Subsequently, the mixture was kept at the same temperature until an acid value <10 mg KOH/g was obtained.

Example 10

An amount of 20.8 g of dibutyl amine was charged into a 0.5-liter reaction flask equipped with a stirrer, a thermocouple, a condenser, a nitrogen inlet, and a heating mantle. The reactor flask was heated to 80° C. and 38.6 g of Cardura® E10P were added over 1 hour whilst maintaining the temperature at 80° C. The mixture was then heated to 125° C. for 4 hours. The reaction was cooled to 60° C. and 74.4 g of hexahydrophthalic anhydride were added. The mixture was heated to 150° C. and kept at the same temperature for 1 hour, after which 0.25 g of triphenyl phosphine was added. Subsequently 115.9 g of Cardura® E10P were added over 2.5 hours whilst maintaining the reaction at 150° C. After the addition of the Cardura® E10P, the mixture was kept at the same temperature until the acid value was below 5 mg KOH/g.

Example 11

In a 1-liter reaction flask equipped with a stirrer, a thermocouple, a condenser, a Dean-Stark trap, a nitrogen inlet, and a heating mantle, 73.3 g of 2-butyl-2-ethyl-1,3-propanediol were mixed with 98.5 g of cyclohexane-1,2-dicarboxylic acid, 98.5 g of cyclohexane-1,4-dicarboxylic acid, and 0.14 g of Fascat® 4101. The mixture was heated to 200° C. and kept at this temperature for 1 hour, after which it was cooled to 150° C. and 0.54 g of triphenyl phosphine was added. Then 286.6 g of Cardura® E10P were added over 2 hours whilst maintaining the reaction at 150° C. The mixture was kept at the same temperature until an acid value <5 mg KOH/g was obtained.

Example 12

In a 1-liter reaction flask equipped with a stirrer, a thermocouple, a condenser, a Dean-Stark trap, a nitrogen inlet, and a heating mantle, 41.7 g of 2,2-bis(hydroxymethyl) propanoic acid were mixed with 239.0 g of hexahydro-phthalic anhydride and 0.7 g of triphenyl phosphine. The mixture was heated to 150° C. and kept at 150° C. for a further hour. Then 425.5 g of Cardura® E10P were added over 3 hours whilst maintaining the reaction at 150° C. The mixture was kept at the same temperature until an acid value <12 mg KOH/g was obtained.

Example 13

In a 1-liter reaction flask equipped with a stirrer, a thermocouple, a condenser, a Dean-Stark trap, a nitrogen inlet, and a heating mantle, 129.4 g of hexahydro-phthalic anhydride were mixed with 302.4 g of Cardura® E10P and 0.43 g of zinc acetate. The mixture was heated to 90° C. and kept at this temperature for 4 hours. The acid value of the product was <5 mg KOH/g.

Example 14

Into a 0.5-liter reaction flask equipped with a stirrer, a thermocouple, a condenser, a Dean-Stark trap, a nitrogen inlet, and a heating mantle, 227.6 g of the polyester prepared according to Example 7 were charged and heated to 100° C. Then 54.3 g of acetic anhydride were added and the mixture was kept at 120° C. for 2 hours. The mixture was then heated to 150° C. and acetic acid collected in the Dean-Stark trap. The mixture was heated at the same temperature until an acid value <5 mg KOH/g was obtained.

Example 15

In a 500 ml reaction flask equipped with a stirrer, a thermocouple, a condenser, a nitrogen inlet, and a heating mantle, 45.1 g of 2-ethylhexanol were mixed with 80.1 g of hexahydrophthalic anhydride. The mixture was heated to 150° C. and kept at the same temperature for 1 hour, after which 0.25 g of triphenyl phosphine was added. 124.6 g of Cardura® E10P were then added over 3 hours whilst maintaining the reaction at 150° C. After the addition of Cardura® E10P, the mixture was kept at the same temperature until an acid value <10 mg KOH/g was obtained.

Example 16

In a 0.5-liter reaction flask equipped with a stirrer, a thermocouple, a condenser, a Dean-Stark trap, a nitrogen inlet, and a heating mantle, 37.6 g of trimethylol propane, 21.6 g of hexahydrophthalic anhydride, and 0.03 g of Fascat® 4101 were mixed and heated to 200° C. and kept at 200° C. for 4 hours. The mixture was then cooled to 120° C. and 86.3 g of hexahydrophthalic anhydride were added and the whole was kept at 120° C. for a further 2 hours. The mixture was then heated to 150° C. and 0.27 g of triphenyl phosphine was added. 134.3 g of Cardura® E10P were then added over 3 hours whilst maintaining the temperature at 150° C. After the addition of the Cardura® E10P, the mixture was kept at the same temperature until an acid value <5 mg KOH/g was obtained.

Example 17

Into a 1-liter reaction flask equipped with a stirrer, a thermocouple, a condenser, a Dean-Stark trap, a nitrogen inlet, and a heating mantle, 177.0 g of 1-methoxy-2-propyl acetate (Dowanol® PM Acetate) were charged and heated to 150° C. Then 93.9 g of hydroxypropyl methacrylate, 90.0 g of butyl methacrylate, 60.0 g of methyl methacrylate, 8.8 g of 1-octanethiol, and 6.5 g of tert-butyl peroxy-2-ethylhexanoate (Trigonox® 21, available from Akzo Nobel Chemicals) were added to a 1-liter conical flask. This mixture was added to the reactor over 3 hours, whilst maintaining the temperature of the reaction at 150° C. The mixture was kept at 150° C. for a further hour and 5.0 g of Trigonox® 21 were then added. The reaction was kept at 150° C. for another hour. The mixture was then cooled to 80° C. and 100.5 g of hexahydrophthalic anhydride were added. The temperature of the mixture was then increased to 150° C. and kept there for 2 hours, after which 0.51 g of triphenyl phosphine was added. Then 162.9 g of Cardura® E10P were added over 2 hours whilst maintaining the reaction at 150° C. After the addition of the Cardura® E10P, the mixture was kept at the same temperature until an acid value <20 mg KOH/g was obtained.

Example 18

In a 1-liter reaction flask equipped with a stirrer, a thermocouple, a condenser, a nitrogen inlet, and a heating mantle, 69.9 g of pentaerythritol were mixed with 205.5 g of succinic anhydride. The mixture was heated to 150° C. and kept at the same temperature for 1 hour, after which 0.91 g of triphenyl phosphine was added. Then 513.5 g of Cardura® E10P were added over 2.5 hours whilst maintaining the reaction at 150° C. After the addition of the Cardura® E10P, the mixture was kept at the same temperature until an acid value <5 mg KOH/g was obtained.

Compatibility Evaluation of the Resins of Examples 1-15

To test the compatibility of the compatibilizer resins of Examples 1-15 with a range of base paint binder systems, the following evaluation procedure was carried out.

The evaluation was carried out with the following base resins: an acrylic polyol, an oxidatively drying alkyd based on tall oil fatty acid and pentaerythritol with an oil length of 64%, an acrylic polyamine, Synocure® 892 BA70 available from Cray Valley, and a polysiloxane (Dow Corning® 3074 Intermediate).

The base resins and the compatibilizer resins were mixed in a mixing ratio of 10:1. Approximately 0.25 g of the compatibilizer resin was weighed accurately into four glass vials. Into each vial approximately 2.5 g of the required base resin were then weighed accurately. Then into each vial approximately 2.75 g of the solvent (1-methoxy-2-propyl acetate) were weighed accurately. The samples were mixed until completely dissolved. In the case of the vial containing Dow Corning® 3074 Intermediate, 0.125 g of 3-aminopropyl triethoxysilane and 0.05 g of dibutyl tin dilaurate were added. Then films were applied for all samples using a 400 μm film applicator bar on a glass panel and stored at 25° C. for 24 hours. The tests were repeated with a storage temperature of 10° C. The compatibility was evaluated visually and categorized as either OK (clear film), slightly cloudy or cloudy.

In all cases, the films remained clear and no cloudiness was observed, indicating that the compatibilizer resins are fully compatible with the various binder resins.

Compatibility Evaluation of the Resin of Example 18

The compatibility of the compatibilizer resin of Example 18 was tested with the following resins: acrylic resins Setalux® 1385 and Setalux® 1161 available from Nuplex Resins, Setal® 164, a polyester polyol resin available from Nuplex Resins, and a blend of two cellulose acetate butyrate resins available from Eastman Chemical Company.

Each resin, or resin blend in the case of the cellulose acetate butyrates, was mixed with the compatibilizer resin in a 100 ml glass bottle using a mixing ratio of 10:1. To 1 g of compatibilizer resin were added 10 g of the resin being tested. Then to each bottle 11 grams of 1-methoxy-2-propyl acetate solvent were added. The bottles were shaken vigorously until the resin sample had dissolved. The samples were initially judged in the bottle for any indication of incompatibility such as phase separation or haziness. After storage at 25° C. for 24 hours all the samples appeared homogenous and clear. The samples were then applied as a wet film using a 200-micron applicator bar on acetate sheets and stored at 25° C. for 24 hours. The drawdowns were evaluated visually and categorized as either OK (clear film), slightly cloudy or cloudy. In all cases the resin films remained clear and no cloudiness was observed, which demonstrates that the compatibilizer resin is fully compatible with the tested resins.

Viscosity

A pigment concentrate was formulated comprising 25 wt. % of a blue pigment, Sunfast® Blue 15.2, 15 wt. % of a 30% solution of the polyester prepared in Example 7, 26 wt. % of a thermosetting acrylic resin, Setalux® 1385 BX51, 24 wt. % of a dispersant, Disperbyk® 170, and 10 wt. % of butyl acetate solvent. The solid content was about 50 wt. %. The pigment to binder ratio was about 1.

Zirconia beads (200 g) of diameter 1.25-1.6 mm were added to a glass bottle of volume 370 ml. Next, 125 g of the pigment paste premix were added to the bottle. A further 190 g of the zirconia beads were added. A screwtop lid was fitted and the bottle placed in a shaker. The bottle was shaken for 90 minutes in order to achieve a pigment paste Hegman grind of <10 microns.

The paste viscosity was measured using a CAP2000 cone and plate viscometer at a shear rate of 75 rpm and 750 rpm, respectively. At a shear rate of 75 rpm, the paste had a viscosity of 2.0-2.5 cPs, while the 750 rpm viscosity was 1.5-1.8 cPs. This means that although the pigment content was more than 30% higher than that of the prior art pastes, the viscosity was still lower.

Determination of Achievable VOC

Pigment concentrates were prepared using the compatibilizer resins of Examples 1, 2, 3, 5, 7, and 14. A comparative test was carried out using Laropal® A81, available from BASF. In the pigment concentrates Solsperse® 38500, available from Noveon Performance Coatings, was used as a dispersant. The evaluation was carried out with the following pigments: a titanium dioxide (Tioxide® TR92, available from Huntsman), yellow iron oxide (Bayferrox® Yellow 3920 of Bayer), carbon black (Special Black 100, available from Degussa), a blue copper (II) phthalocyanine pigment (Monastral® Blue CSN, available from Heubach), and a red pigment (Irgazin® Red 2030, available from Ciba Specialty Chemicals).

The pigment concentrates were prepared by dissolving the compatibilizer resins in 1-methoxy-2-propyl acetate. The compatibilizer resin solution was then mixed with further solvent and the dispersant, Solsperse® 38500. Pigment was added under agitation at a temperature of 40° C. Glass beads of 1 mm diameter were added in a 1:1 weight ratio with respect to the total colorant weight. For the Bayferrox® Yellow 3920 colorant, a 1:1.4 weight ratio was used. The mixture was then mixed with a speed of 8,000-10,000 rpm and filtered using a 250 μm polyester mesh for separation from the grinding media. In all cases the product was a fluid, pourable pigment concentrate. Table 1 shows that a VOC of 250 g/l or less can be achieved. Table 2 shows the formulations of the pigment concentrates.

TABLE 1

| | VOC (grams per litre) | | | | |
|---|---|---|---|---|---|
| LDR | Bayferrox® Yellow 3920 | Monastral® Blue CSN | Special Black 100 | Tioxide® TR 92 | Irgazin® Red 2030 |
| Laropal® A81 | 260 | 325 | 330 | 250 | 260 |
| Example 1 | 250 | 250 | 220 | 250 | 200 |
| Example 2 | 245 | 220 | 240 | 230 | 235 |
| Example 3 | 210 | 185 | 210 | 215 | 170 |
| Example 5 | 150 | 200 | 190 | 190 | 170 |
| Example 7 | 240 | 250 | 235 | 230 | 220 |
| Example 14 | | 190 | | 180 | |

TABLE 2

Formulations of pigment concentrates (in percentages by weight)

| | Laropal A81 | Ex. 1 | Ex. 2 | Ex. 3 | Ex. 5 | Ex. 7 | Ex. 14 |
|---|---|---|---|---|---|---|---|
| Tioxide ® TR 92 | | | | | | | |
| Compatibilizer resin | 20.52 | 34.71 | 32.88 | 34.38 | 35.18 | 32.98 | 35.18 |
| Solsperse ® 38500 | 5.69 | 4.51 | 4.51 | 4.51 | 4.51 | 4.51 | 4.51 |
| 1-methoxy-2-propyl acetate | 8.79 | 9.26 | 11.09 | 9.59 | 8.79 | 10.99 | 8.79 |
| Pigment | 65.00 | 51.52 | 51.52 | 51.52 | 51.52 | 51.52 | 51.52 |
| VOC (Theoretical) | 252.3 | 197.9 | 239.64 | 214.59 | 201.06 | 239.5 | 201.06 |
| Pigment: binder ratio | 2.77 | 1.46 | 1.57 | 1.50 | 1:46 | 1:46 | 1:46 |
| Bayferrox ® Yellow 3920 | | | | | | | |
| Compatibilizer resin | 27.71 | 42.66 | 41.69 | 43.20 | 43.20 | 40.50 | |
| Solsperse ® 38500 | 5.42 | 4.50 | 4.5 | 4.50 | 4.50 | 4.50 | |
| 1-methoxy-2-propyl acetate | 11.87 | 11.34 | 12.31 | 10.8 | 10.8 | 13.5 | |
| Pigment | 55.00 | 41.50 | 41.50 | 41.50 | 41.50 | 41.5 | |
| VOC (Theoretical) | 275.9 | 220.36 | 235.5 | 211.89 | 211.9 | 254.3 | |
| Pigment: binder ratio | 1.99 | 0.97 | 1.00 | 0.96 | 0.96 | 0.96 | |
| Monastral ® Blue CSN | | | | | | | |
| Compatibilizer resin | 54.03 | 63.44 | 64.25 | 64.25 | 64.25 | 60.23 | 64.25 |
| Solsperse ® 38500 | 7.99 | 5.10 | 5.10 | 5.10 | 5.10 | 5.10 | 5.10 |
| Solsperse ® 5000 | 0.76 | 0.51 | 0.51 | 0.51 | 0.51 | 0.51 | 0.51 |
| 1-methoxy-2-propyl acetate | 23.14 | 16.87 | 16.06 | 16.06 | 16.06 | 20.08 | 16.06 |
| Pigment | 14.08 | 14.08 | 14.08 | 14.08 | 14.08 | 14.08 | 14.08 |
| VOC (Theoretical) | 310.1 | 215.1 | 220.0 | 220.04 | 220.04 | 266.4 | 220.04 |
| Pigment: binder ratio | 0.25 | 0.22 | 0.22 | 0.22 | 0.22 | 0.22 | 0.22 |

TABLE 2-continued

Formulations of pigment concentrates (in percentages by weight)

| | Laropal A81 | Ex. 1 | Ex. 2 | Ex. 3 | Ex. 5 | Ex. 7 | Ex. 14 |
|---|---|---|---|---|---|---|---|
| Special Black 100 | | | | | | | |
| Compatibilizer resin | 59.32 | 66.94 | 65.43 | 67.79 | 67.79 | 63.56 | |
| Solsperse ® 38500 | 2.54 | 2.54 | 2.54 | 2.54 | 2.54 | 2.54 | |
| 1-methoxy-2-propyl acetate | 25.42 | 17.79 | 19.31 | 16.95 | 16.95 | 21.19 | |
| Pigment | 12.72 | 12.73 | 12.72 | 12.72 | 12.72 | 12.72 | |
| VOC (Theoretical) | 311.0 | 222.9 | 240.5 | 213.10 | 213.10 | 262.1 | |
| Pigment: binder ratio | 0.21 | 0.19 | 0.19 | 0.19 | 0.19 | 0.19 | |
| Irgazin ® Red 2030 | | | | | | | |
| Compatibilizer resin | 49.83 | 58.75 | 54.97 | 59.50 | 59.50 | 53.39 | |
| Solsperse ® 38500 | 3.81 | 3.22 | 3.81 | 3.22 | 3.22 | 3.81 | |
| 1-methoxy-2-propyl acetate | 21.36 | 15.62 | 16.22 | 14.87 | 14.87 | 17.80 | |
| Pigment | 25.00 | 22.41 | 25.00 | 22.41 | 22.41 | 25.00 | |
| VOC (Theoretical) | 259.91 | 203.14 | 215.5 | 194.53 | 194.53 | 233.8 | |
| Pigment: binder ratio | 0.50 | 0.38 | 0.45 | 0.38 | 0.38 | 0.38 | |

The invention claimed is:

1. A non-aqueous pigment concentrate comprising one or more pigments, one or more dispersants, and at least one resin, wherein the at least one resin is a polyester comprising at least one oligo-ester building block with a hydrophobic tail linked thereto, and wherein the hydrophobic tail is selected from the group consisting of:
 branched hydrocarbons,
 hydrocarbons containing a cyclic group, and
 linear hydrocarbons, provided that when said linear hydrocarbon is linked to the at least one oligo-ester building block via an ester group, the linear hydrocarbon contains 3 to 12 carbon atoms,
 and wherein the resin comprises at least one group originating from a mono-functional compound selected from the group consisting of alcohols, amines, carboxylic acids, or thiols.

2. The pigment concentrate according to claim 1, wherein at least part of said at least one oligo-ester building block is obtained from a cyclic carboxylic anhydride or an ester-forming derivative thereof.

3. The pigment concentrate according to claim 2, wherein the cyclic carboxylic anhydride is hexahydrophthalic anhydride.

4. The pigment concentrate according to claim 1, wherein at least part of the at least one oligo-ester building block is obtained by reacting a dicarboxylic acid or a carboxylic anhydride with a monoepoxide.

5. The pigment concentrate according to claim 4, wherein the monoepoxide is a glycidyl ester of an aliphatic acid.

6. The pigment concentrate according to claim 4, wherein the monoepoxide is a glycidyl ether.

7. The pigment concentrate according to claim 1, wherein said compound is 2-ethylhexanol or ditrimethylol ethane.

8. The pigment concentrate according to claim 1, wherein the at least one resin comprises on one end of the polymer chain a tail originating from a monofunctional compound selected from the group consisting of alcohols, amines, carboxylic acids, and thiols.

9. The pigment concentrate according to claim 1, wherein the pigment concentrate has a volatile organic content VOC not exceeding 250 g/l.

10. The pigment concentrate according to claim 1, further comprising an additional resin.

11. The pigment concentrate according to claim 10, wherein the additional resin is an acrylate resin.

12. A coating composition comprising the pigment concentrate of claim 1.

13. A method for preparing the pigment concentrate of claim 1, the method comprising: grinding the one or more pigments with the one or more dispersants, and adding the at least one resin during or after grinding.

* * * * *